(No Model.)
M. J. COHOLAN.
VENTILATED SEWER PIPE.
No. 318,452. Patented May 26, 1885.
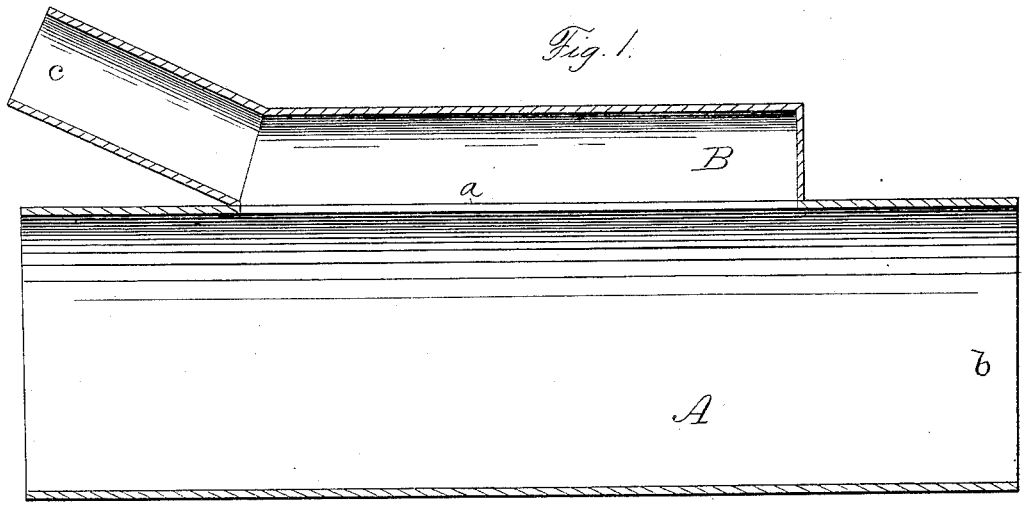
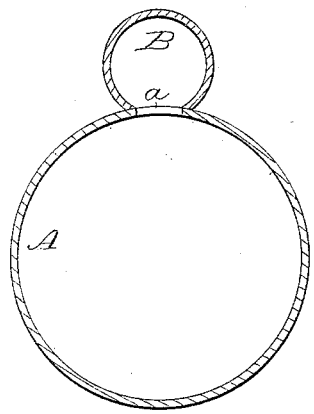
Witnesses.
John Edwards Jr.
Eddy N. Smith
Inventor.
Michael J. Coholan
By James Shepard
Atty.

UNITED STATES PATENT OFFICE.

MICHAEL J. COHOLAN, OF NEW BRITAIN, CONNECTICUT.

VENTILATED SEWER-PIPE.

SPECIFICATION forming part of Letters Patent No. 318,452, dated May 26, 1885.

Application filed January 29, 1885. (No model.)

*To all whom it may concern:*

Be it known that I, MICHAEL J. COHOLAN, a citizen of the United States, residing at New Britain, in the county of Hartford and State of Connecticut, have invented certain new and useful Improvements in Ventilated Sewer-Pipe, of which the following is a specification.

In the accompanying drawings, Figure 1 is a longitudinal sectional view of my improved sewer-pipe, and Fig. 2 is a cross-section thereof.

A designates the pipe leading from the house to the sewer, which pipe is provided with a longitudinal slot, $a$, and B designates my improved ventilating pipe or tube. With the exception of the slot $a$, the pipe A is the same as an ordinary pipe which connects the house with the sewer.

I provide the ordinary sewer-pipe A with the longitudinal slot $a$, and upon said pipe A a ventilating pipe or tube, B, is placed over the slot in the sewer-pipe A, one side of which ventilating tube or pipe is cut away, so that when in place upon the pipe A the two pipes will communicate with each other for the entire length of the slot $a$.

The gases, which are continually arising from the sewer, will pass in through the pipe A from the end $b$ until they reach the slot $a$, when they rise through said slot into the ventilating pipe or tube B, whence they pass through a continuation of said tube into the chimney or any other suitable conductor which leads to the open air at the top of the house.

The particular size and form of the ventilating tube or pipe B is not essential to my invention so long as they admit of a sufficient length of slot to draw all the gases from the sewer-pipe and prevent them from passing therein to a point beyond the slot $a$.

By placing the ventilating-pipe B upon one side of the main pipe, as shown, so as to form a longitudinal chamber, which is parallel to said main pipe, and connecting them by means of the longitudinal slot, I obtain a much greater length of vertical pipe than can be done by a simple connection having an opening only about equal to the diameter of the vent-tube. In practice I prefer to cast the pipes A and B together, and then connect the ends of the sewer-pipe and the single end $c$ of the ventilating-pipe to other pipes in any ordinary manner. This ventilated section may be placed at any desired point—as, for instance, close to the sewer or cesspool—or two or more of them may be placed at different points along the sewer-pipe.

I claim as my invention—

In combination with a sewer-pipe, an extended gas-collecting chamber parallel with and open throughout its entire length to said sewer-pipe, and a gas-discharge pipe leading outward from said chamber, all substantially as herein described, and for the object specified.

MICHAEL J. COHOLAN.

Witnesses:
 EDDY N. SMITH,
 JOHN EDWARDS, Jr.